Aug. 2, 1938.   H. C. HAAG   2,125,718
FISHING LINE FLOAT
Filed Jan. 15, 1938

Herbert C. Haag  INVENTOR.
BY  Thus Shumacher  ATTORNEY.

Patented Aug. 2, 1938

2,125,718

UNITED STATES PATENT OFFICE 2,125,718

FISHING LINE FLOAT

Herbert C. Haag, Carlstadt, N. J.

Application January 15, 1938, Serial No. 185,095

4 Claims. (Cl. 43—49)

This invention relates to devices such as fishing line floats.

One object of the invention is to provide a device of the character described which shall have improved means free of any movable parts and adapted nevertheless for the simple and reliable securement by means of adjustable or slidable slip loops of the float to the fishing line, and without forming kinks or other bends that tend to deform and mar the usefulness of relatively expensive fishing lines.

A related object of the invention is the provision of a float of the class mentioned wherein the rigid means referred to affords the additional advantages of permitting such means to be cast or molded as a one piece structure of rugged, durable character, while the improved arrangement used not only facilitates the accomplishment of the molding operation in a simple manner but renders particularly convenient the rapid slip loop engagement of the fishing line with the improved securing means of the float.

Another object of the invention is the provision of such improved float which is relatively symmetrically constructed and balanced and which shall not accidentally catch or cause tangling of the fishing line at the securing means alluded to, and wherein the float can be readily slid along the fishing line and quickly detached therefrom without any particular care or skill, as occasion may require.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

Figure 1:
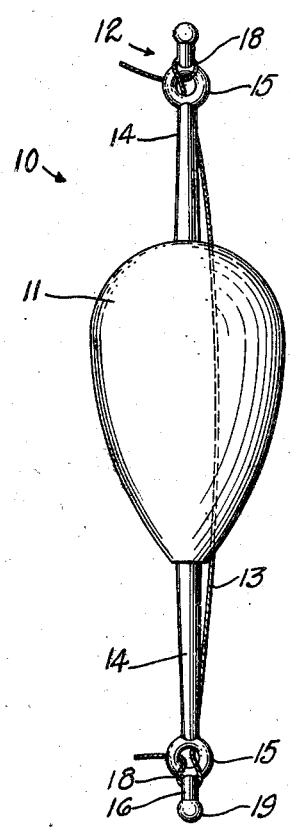
Figure 1 is a view in vertical elevation showing a device embodying the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, the invention provides a fishing line float 10 having a float body 11 of spheroidal, oval or other suitable form, desirably made of Celluloid or other plastic composition. Disposed along an axis of the float body, for instance, on the long axis of an ovoid form are projecting securing means 12 for the engagement with the fishing line 13. For example, said means 12 may each include a stem 14 integrally formed with the float body 11 or suitably connected thereto, each stem 14 having mounted therealong an eye portion 15 and a projecting portion 16 spaced from the former so as not to obstruct the eye opening 17 and interfere with the passing of fishing line loops 18 through the eyes 17. While the projecting portion 16 may extend directly from the eye portion 15 or directly from the stem 14, and in different angular relations to the eye portion 15, I prefer to utilize the specific arrangement herein shown. The same includes the eye portions 15 lying along a plane determined by the axial stems 14 and intermediate the ends of each stem to thus provide a symmetrical arrangement to permit the line loops 18 to be conveniently passed into the eye holes 17 at either side of the said plane. This symmetrical relationship is maintained by the free end portions 16 of the stems 14 which afford stud or anchor elements that project axially outward beyond the eye portions 15 and desirably terminate in retaining heads 19.

Figure 2:
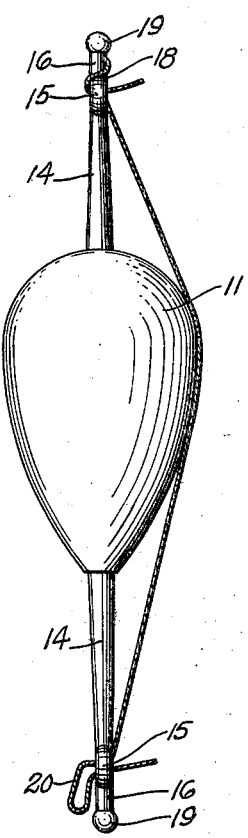
Fig. 2 is a similar view thereof but taken at a different angle, and showing one of the slip loops in course of being attached.
Figure 3:
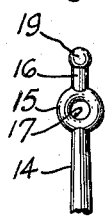
Fig. 3 is a view of the securing means with the fishing line removed.
Figure 4:
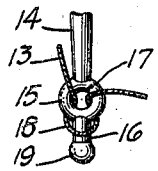
Fig. 4 is a similar view but showing a different view of the slip loop.

According to the invention, the fishing line 13 is formed with the spaced open loops or folds 20 as shown in Fig. 2 which are passed through the eyes 17, and then passed over the anchor elements 16 at the inner side of the heads 19 thereof, to thus provide the securing slip loops 18 which cannot accidentally pull through the eyes, and which frictionally reliably cause the float to be secured in the required relation to the line. The part of the latter intermediate of the slip loops extends snugly along a side of the float as shown.

It will be noted that in the use of the invention, no manipulation of movable or bendable parts on the float is required, the structure being rigid throughout and thus lending itself at once to rugged and compact arrangements which can be cheaply molded or cast complete. A related advantage is that the fishing line may be attached at whichever side happens to present itself while the float is being held in the hand of the operator. Another advantage is that pinching, clamping, knotting with resultant sharp bends or kinks which tend to mar expensive fishing lines are avoided, the thin fishing line easily following around the relatively thick body of the securing means 12, which is curved and smooth throughout and may be readily made so in molding or casting operations without requiring any finishing.

It will be perceived that the symmetrical float construction described lends itself to inexpensive molding as by plastic injection die machinery. Since the means 12 are exact duplicates of each other, a single two piece mold will form both as where the means 12 is made separately of the float body and thereafter suitably secured or cemented thereto.

I claim:

1. A fishing float comprising a body having a projecting means thereon, said means including an eye and a member extending from the eye so that the opening thereof is unobstructed, said eye being adapted to receive a loop formed in the fishing line with a closed end of the loop passed over and around the member to form a slip loop for anchoring the float to the line, said member serving to prevent said loop from passing back through said eye, said eye and extension being relatively rigidly related and constituting a one piece structure.

2. A fishing line float comprising a body, and a projecting stem alined with an axis of the body, said stem terminating in a head, and said stem having an eye intermediate of the ends of the stem, said eye being free to receive a loop of the line, as and for the purpose set forth.

3. A float for a fishing line including a body having alined oppositely extending stems connected thereto, each of said stems having an eye adjacent to the free end thereof, and a fishing line having spaced loops passed through their individual eyes and looped over the corresponding stems to thus slidably and frictionally secure the float to said line, said eyes being relatively free and unobstructed at the opposite faces of each for receiving the loops of the line at either of their faces.

4. A float for a fishing line, including a body having alined oppositely extending stems connected thereto, each of said stems having an eye adjacent to the free end thereof, projections spaced from the eyes and being in relatively fixed rigid relation thereto, and a fishing line having spaced loops passing through the eyes and looped over the projections.

HERBERT C. HAAG.